(12) United States Patent
Low et al.

(10) Patent No.: US 8,321,075 B2
(45) Date of Patent: Nov. 27, 2012

(54) MITIGATING EFFECTS OF BIODYNAMIC FEEDTHROUGH ON AN ELECTRONIC CONTROL DEVICE

(75) Inventors: Thomas Low, Belmont, CA (US); Kevin Hufford, St. Petersburg, FL (US)

(73) Assignee: SRI International, Menlo Park, CA (US)

( * ) Notice: Subject to any disclaimer, the term of this patent is extended or adjusted under 35 U.S.C. 154(b) by 948 days.

(21) Appl. No.: 12/391,999

(22) Filed: Feb. 24, 2009

(65) Prior Publication Data

US 2009/0216374 A1     Aug. 27, 2009

Related U.S. Application Data

(60) Provisional application No. 61/031,260, filed on Feb. 25, 2008.

(51) Int. Cl.
*G06D 1/00* (2006.01)
*G06F 7/00* (2006.01)

(52) U.S. Cl. ........... 701/10; 701/1; 701/3; 701/4; 701/5; 701/6

(58) Field of Classification Search ........................ None
See application file for complete search history.

(56) References Cited

U.S. PATENT DOCUMENTS

4,477,043 A    10/1984  Repperger
2007/0142968 A1  6/2007  Prisco et al.

*Primary Examiner* — Khoi Tran
*Assistant Examiner* — Bhavesh V Amin
(74) *Attorney, Agent, or Firm* — Beyer Law Group LLP (57) ABSTRACT

Biodynamic feedthrough in a master control system can be mitigated. An accelerometer is used to measure the acceleration of an environment. In one embodiment, mitigation damping forces can then be determined based on the velocity of an effector of a haptic manipulator and the measured accelerations. The haptic manipulator applies the mitigation damping forces as force feedback. In another embodiment, biodynamic feedthrough can be filtered from the input signal. Parameters for a model can be accessed based on the position of the effector, and the model can be used to predict biodynamic feedthrough from the measured accelerations.

14 Claims, 5 Drawing Sheets

MITIGATING EFFECTS OF BIODYNAMIC FEEDTHROUGH ON AN ELECTRONIC CONTROL DEVICE

CROSS-REFERENCE TO RELATED APPLICATION

This application claims priority under 35 U.S.C. 119(e) from co-pending U.S. Provisional Patent Application No. 61/031,260 filed Feb. 25, 2008 entitled "Acceleration Compensation for Vehicle Based Telesurgery on Earth or in Space," which is hereby incorporated by reference herein for all purposes.

FIELD OF THE INVENTION

The present invention generally relates to electronic control devices and, particularly, to mitigating the effects of biodynamic feedthrough on such a control device.

BACKGROUND OF THE INVENTION

Electronic control devices and control systems, including haptic devices—are currently used for a multitude of purposes. These devices range from relatively simple devices, such as a force feedback joystick used for playing computer games, to very sophisticated and expensive robotic surgical systems. A basic high-level prior art electronic control system is now described with reference to FIG. 1.

Figure 1:
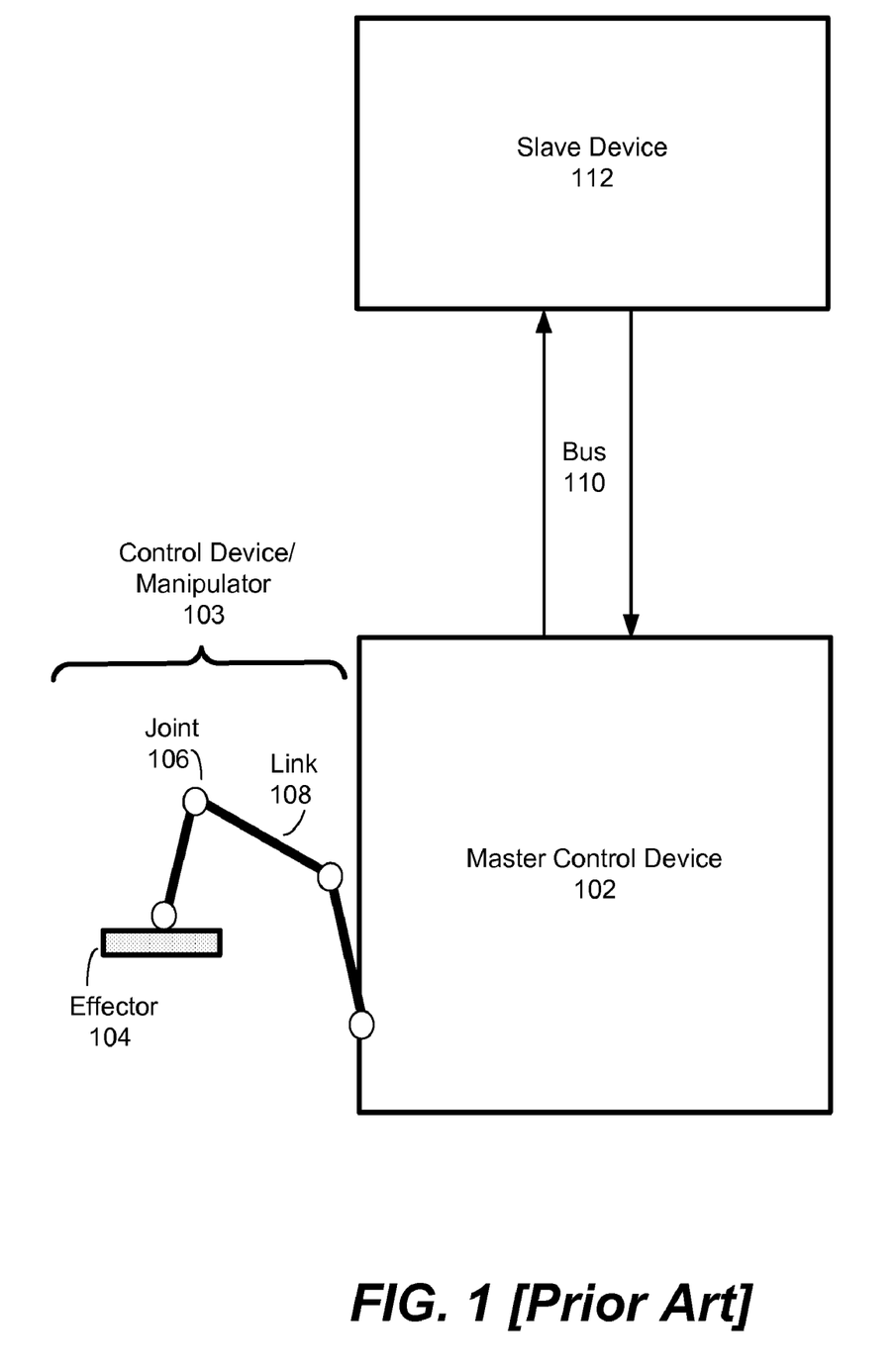
FIG. 1 illustrates a prior art master-slave control system.

A prior art control system includes master control system 102. The master control system includes a manipulator 103. The manipulator 103 has an effector 104 that is moved by a user (not shown) in three dimensional space. Enabling such movement of the effector 104 are links 108 and joints 106. Each joint 106 rotates in one or more degrees of freedom, allowing movement of the effector 104.

The manipulator 103 sends data about the movement of the effector 104 to the master control device 102. The master control device 102 uses this data to control a slave device 112. The slave device 112 may be a physical slave device—such as a tool on the Mars rover being controlled from Earth or a surgical tool controlled remotely by a surgeon—or the slave device 112 could be a virtual slave device—such as an avatar or vehicle being controlled in a video game.

The master control device 102 uses the manipulator data to generate a control signal to control the slave device 112, and sends the control signal to the slave device 112 via bus 110. Bus 110 may be any communication medium, including a direct fiber optic link, wireless link, USB cable, communication over a public network such as the Internet, or some combination of communication techniques.

The slave device 112 may send back information about what is happening on the slave side, whether physical or virtual. For example, the slave device 112 may be wielding a surgical tool, and send back a signal indicating the position of the surgical tool and various other forces acting on the surgical tool. In a virtual slave device 112, a video game may send back data indicating the position of an avatar in a virtual environment, such as when an avatar has walked into a virtual wall for example.

From the signal received from the slave device 112, the master control system 102 can determine a force feedback to be provided to the manipulator 103. For example, by comparing the control signal sent by the master controller 102 and the data regarding what is happening at the slave device 112, the master controller 102 can determine an appropriate force feedback signal.

The force feedback signal is provided to the manipulator 103. The joints 106 of the manipulator can house or be connected to motors—such as electric or hydraulic motors for example—that can provide force feedback to the user holding the effector 104. Since such haptic devices are well known in the art, they are not described in great detail herein. One example of control system using such haptic devices is the robotic surgical system described in some detail in U.S. Pat. No. 6,493,608 "Aspects of a Control System of a Minimally Invasive Surgical Apparatus," assigned to Intuitive Surgical, Inc. Some examples of haptic devices that could be used for master control device 102 include, but are not limited to, the PHANTOM line of haptic devices from SenseAble Technologies, Inc. (http://www.sensable.com), and the omega.x line of haptic devices from Force Dimension (http://www.forcedimension.com).

Vehicle control system designers have long been aware of biodynamic feedthrough, defined generally as the effects of vehicle motion feeding through the operator's body to produce unintended forces on the vehicle control interface. In the automotive field, biodynamic feedthrough has been ignored as insignificant, but some effort has been made to mitigate biodynamic feedthrough on a fighter jet control stick, as described in U.S. Pat. No. 4,477,043 "Biodynamic Resistant Control Stick," assigned to the U.S. Air Force.

The manufacturers of haptic devices and, such as those mentioned above, and other non-haptic control systems, have not contemplated the used of their control devices in dynamic environments, such as moving vehicles, airplanes, space vehicles, and so on. For example, the robotic surgical system described in U.S. Pat. No. 6,493,608 assumes that both master and slave devices are located in a stable environment, such as a hospital.

Furthermore, the manufacturers of haptic devices have also not contemplated that their products will be used in gravitational environments different from Earth's, or in variable gravitational environments, such as in planes, space vehicles, space stations, or extra-terrestrial surface bases.

SUMMARY OF THE INVENTION

The present invention relates to mitigating and filtering biodynamic feedthrough in a master control system that controls the movements of a slave device. An accelerometer is used to measure the acceleration of an environment. In one embodiment, a haptic manipulator is used as the control device of the master control system. The manipulator tracks the movements of an effector and can apply haptic force feedback at the effector.

In one embodiment, the instantaneous velocity of the effector is calculated, and feedthrough mitigation damping forces can then be determined based on the velocity of an effector and the measured accelerations. The haptic manipulator applies the mitigation damping forces as force feedback.

In another embodiment, biodynamic feedthrough can be filtered from the input signal that is generated to track the movements of the effector. Parameters for a model can be accessed based on the position of the effector, the orientation of the effector, or both. The model can then be used to predict biodynamic feedthrough from the measured accelerations.

These and other features and advantages of the present invention will be described in the following description of the invention and associated figures.

BRIEF DESCRIPTION OF THE DRAWINGS

The invention and the advantages thereof may best be understood by reference to the following description taken in conjunction with the accompanying drawings in which.

In the drawings, like reference numerals are sometimes used to designate like structural elements. It should also be appreciated that the depictions in the figures are diagrammatic and not to scale.

DETAILED DESCRIPTION OF EXAMPLE EMBODIMENTS

The present invention generally relates to manual control systems and, particularly, to mitigating biodynamic feedthrough in a master control system adapted to allow a user to control a slave device. As will be apparent from the following description, the ability to mitigate and/or filter out biodynamic feedthrough for a master control system affords many advantages and enables a variety of previously unfeasible applications.

A variety of methods and structures for to mitigating and/or filter out biodynamic feedthrough in control devices will be described below. Various aspects of the present invention are described in detail with reference to various example embodiments as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

Figure 2:
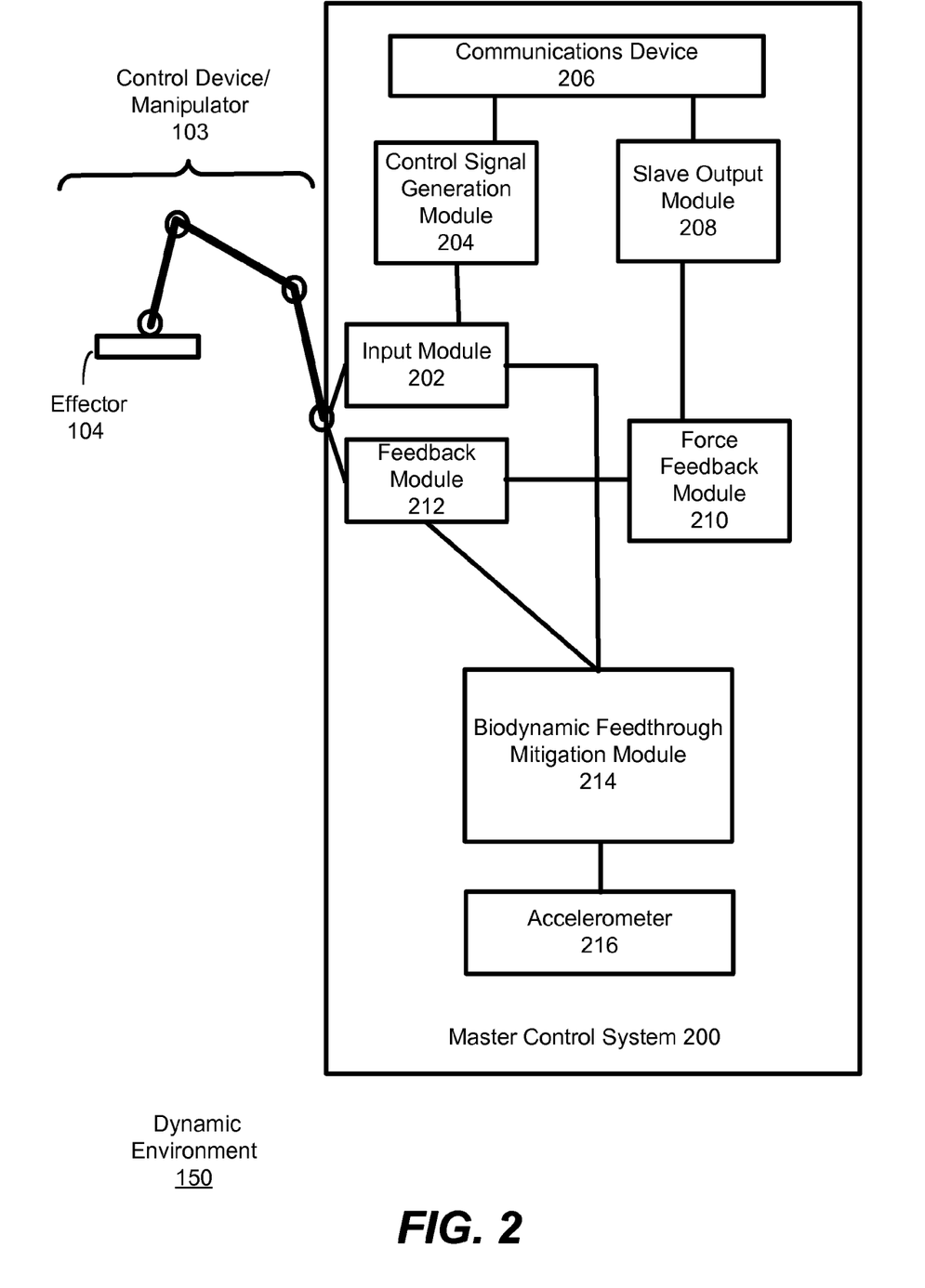
FIG. 2 illustrates a master control system in accordance with an embodiment of the present invention.

Referring to FIG. 2, an example master control system 200 implementing several embodiments of the present invention will be described. As described above with reference to FIG. 1, the master control system 200 includes a manipulator 103 having an effector 104. A user of the system 200 can move the effector 104 six degrees of freedom; namely in three directions and three rotations.

The movements of the effector 104 are sensed by one or more sensors on the manipulator 103. These sensors may be optical sensors, or various sensors tracking the movements at the joints 106 of the manipulator 103. The movements of the effector 104 as captured by the sensors are provided to the master control system 200.

The effector 104 may be in the shape of a stylus—as with the PHANTOM line of devices, it may be a handle—as with the omega.x line of devices, or it may be a detachable, interchangeable, swappable part of the system 200—as allowed, for example, by some of the omega.x devices. For simplicity, the master control system 200 is shown having only one manipulator 103, but it may have two or even more manipulators. For example, the surgical robot described in U.S. Pat. No. 6,493,608 has two manipulators, one for each hand of a surgeon. The master control system 200 may have other input devices, such as footpedals which are not shown or described as they are well known in the art.

Signals from the one or more position sensors on the manipulator 103 are provided to the input module 202. The input module 202 in turn determines what is happening to the effector 104 in space, and provides a signal representing effector movement in three dimensional space to the control signal generation module 204. The space in which the effector 104 can move, and the coordinate system used to describe it is sometimes referred to herein as "effector space."

The control signal generation module 204 determines what should be done at the slave device based on the received effector movement. For example, some devices scale motion and/or amplify or diminish forces. For example, it may be desirable to scale effector motion down if working with something small (such as stitching a patient's cornea), or to amplify lifting force if working with something large (such as lifting a large rock on Mars). Such scaling would be performed by the control signal generation module 204. Basically, the control signal generation module 204 translates effector motion into desired slave device action and motion.

The control signal generation module 204 outputs a control signal to operate the slave device 112 to communications device 206. The communications device 206 performs any necessary encoding and modulation to deliver the slave control signal to the slave device 112 via some communications medium. The communications device 206 also receives signals from the slave device 112, and performs the necessary demodulation and decoding to extract the raw slave output data being sent by the slave device 112 to the master control system 200.

The slave output data (that is data output by the slave device 112) is provided to the slave output module 208. The slave output module 208 interprets the data and creates a signal representing what is happening to the tool wielded by the slave device 112. The slave output module 208 can thus represent movements of the tool and forces acting on the tool of the slave device 112.

This information is then used by the force feedback module 210 to determine what feedback forces the user of the master control system 200 should feel at the effector. For example, if the surgical tool wielded by the slave device has hit a bone and stopped moving forward, the force feedback module will add a feedback force in the opposite direction of the commanded motion so that the user can feel the resistance of the bone against the surgical tool at the effector 104. Once the force feedback module 210 has determined and additively combined the feedback forces to be provided to the user, the feedback module 212 generates commands to the electrical or hydraulic motors of the manipulator 103 to create the feedback forces at the effector 104.

However, in one embodiment of the present invention, the master control system 200 is located in a dynamic environment 150. The dynamic environment may be, for example, a moving vehicle traversing a road or off-road path, a train, an airplane, a ship traversing choppy waters, a space vehicle, a space station, an elevator, or even a terrestrial room during an earthquake. At least the master control system 200 and the user of the master control system 200 are located in the dynamic environment 150. The slave device 112 may or may not be located in the dynamic environment.

The movement of the dynamic environment 150 generates biodynamic feedthrough as the movement of the user's body caused by the movement of the dynamic environment 150 causes unintended and undesired inputs from the user to the effector 104. Several embodiments of the present invention aim to prevent such biodynamic feedthrough by resisting unintended user input at the manipulator 103.

According to one embodiment of the present invention, an accelerometer 216 is added to the master control system 200. Since the dynamic environment 150 moves in three dimensional space, the accelerometer 216 is configured to detect instantaneous acceleration of the dynamic environment 150 along at least three axes. For example, a MAG3 inertial measurement unit made by MEMSense, LLC. (https://memsense.com) can be used as the accelerometer 216, but any other three-axis accelerometer or similar device may be used.

In FIG. 2, the accelerometer 216 is shown to be internal to the master control system 200. However, this is not necessary, and the accelerometer can be located anywhere within the dynamic environment 150. The accelerometer 216 should be located such that it experiences the movement of the dynamic environment identically or substantially similarly to the master control system 200. Where this is not possible, the measurements from the accelerometer can be adjusted to compensate for any discrepancies. To enable digital processing of the accelerometer data, an analog to digital converter may be used to digitize the signal from the accelerometer, but this is not shown for simplicity and for ease of understanding the embodiments described.

A further addition to the master control system 200 is a biodynamic feedthrough mitigation module 214. In one embodiment, the biodynamic feedthrough mitigation module 214 receives data regarding the motion of the dynamic environment 150 from the accelerometer 216, and further receives data from the input module 202 regarding the position and movement of the effector 104. The biodynamic feedthrough mitigation module 214 then determines forces to be applied to the effector 104 to resist biodynamic feedthrough.

The haptic forces enabled by the haptic device shown as master control system 200 were originally designed to provide force feedback to the user. Various embodiments of the present invention use this haptic ability of the master control system 200 to apply forces to the effector 104 to resist biodynamic feedthrough instead of—or in addition to—providing haptic feedback and sensations. For some embodiments of the present invention, the haptic force feedback coming from the slave device 112 to the master control system 200 may be omitted, along with the slave output module 208 and the force feedback module 210.

The feedback module 212, originally intended to receive force feedback forces is used, in several embodiments, to provide forces designed to mitigate biodynamic feedthrough. There are numerous methods and schemes that may be used to determine these biodynamic feedthrough mitigating forces. Several of these methods are now described with reference to FIG. 3.

Mitigating Biodynamic Feedthrough Using Damping

Figure 3:
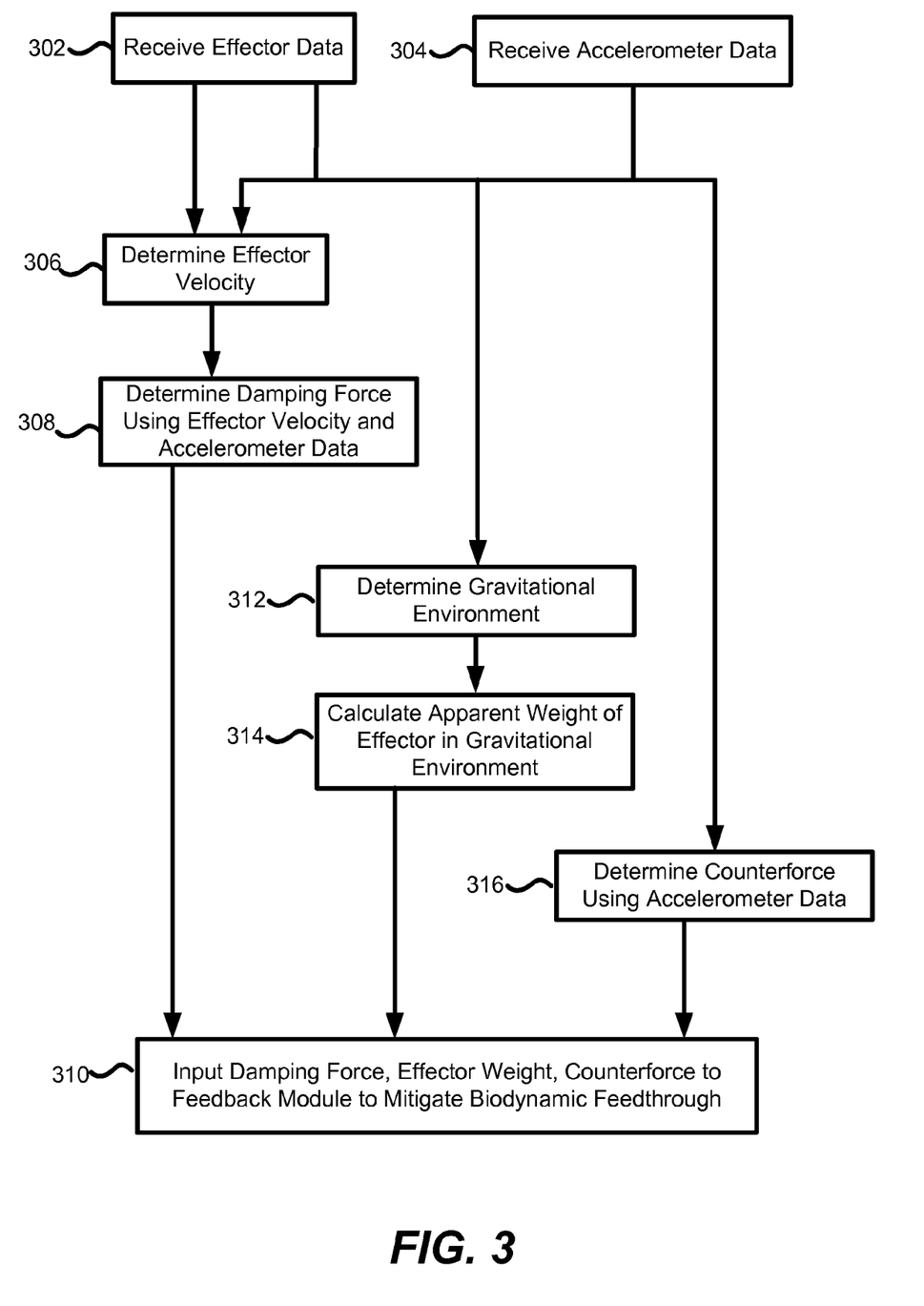
FIG. 3 illustrates various methods for mitigating biodynamic feedthrough in accordance with an embodiment of the present invention.

In one embodiment, the biodynamic feedthrough mitigation module 214 is continuously receiving effector data (block 302) from the input module 202. In one embodiment, the effector data received includes the instantaneous position of the effector 104 in a Cartesian coordinate space representing the three dimensional space in which the effector 104 is able to move ("effector space"). Additional effector data may include various angles describing the current orientation of the effector 104, for example if the effector 104 has a rod shape.

In addition, effector data may include the instantaneous velocity of the effector 104 in the Cartesian coordinate space. Generally, such measurements are provided as data triplets, where position, velocity, and other measurements are represented along each of the three axes of the Cartesian coordinate space.

The biodynamic feedthrough mitigation module 214 is also continuously receiving accelerometer data (block 304) from the accelerometer 216. "Continuously" in the context of digital communications means at or above some minimum sampling rate, such as 50 Hz. The accelerometer data can also be in the form of triples, each member of the triplet representing the instantaneous acceleration of the dynamic environment 150 along one of three axes of motion at a moment in time.

In block 306, the biodynamic feedthrough mitigation module 214 determines the instantaneous velocity of the effector 104. The effector velocity can be provided by the haptic manipulator 103, or the biodynamic feedthrough mitigation module 214 can derive it from the last two to four effector position readings, since the time between position readings is known. Once again, the velocity vector representing the velocity of the effector can be stored as a triplet with each data point representing velocity along one of the three axes in space.

Then, in block 308, the biodynamic feedthrough mitigation module 214 determines a damping force to be provided to the effector 104 using the effector velocity calculated in block 306, and the accelerometer data received in block 304. In one embodiment, the damping force is calculated along each axis of motion separately, since that is the format in which the effector velocity and accelerator data are.

In one embodiment, the damping force along each axis is calculated by determining a damping coefficient, and multiplying the damping coefficient by the velocity of the effector. In this manner, more damping is applied when the effector is moving faster. In one embodiment, the damping coefficient is directly derived from the acceleration of the dynamic environment 150 along the axis being calculated, by multiplying the acceleration by an empirically determined constant. For practical reasons, a maximum damping coefficient may be set, to avoid instability of the manipulator 103 caused by excessive damping.

Mathematically, the calculation of the damping forces according to the embodiment described above can be represented by Equations (1) and (2):

$$K_{di} = \inf[K_{max}, |A_i|C_d] \tag{1}$$

$$F_i = K_{di} V_i \tag{2}$$

Where $K_{di}$ is the damping coefficient in the i-direction (axis), inf[ ] selects the smaller of two quantities, $|A_i|$ is the absolute value of the acceleration in the i-direction, $C_d$ is a constant, $V_i$ is the effector velocity in the i-direction, and $F_i$ is the determined damping force to be applied in the i-direction.

In block 310, the damping forces determined in block 308 are provided to the feedback module 212, which commands motors of the manipulator 103 to provide the damping forces, thus mitigating biodynamic feedthrough.

The feedback module 212 is provided in a haptic device to deliver force feedback. In order to enable purchasers of the haptic device to develop various haptic applications that use the device, the manufacturers of haptic devices provide a software development kit (SDK) containing one or more application program interfaces (APIs). One such API for a haptic device will generally be a function allowing user-specified feedback to the feedback module 212 so that the programmer can develop various force feedback schemes.

In one embodiment, the present invention uses these function calls to input the determined damping forces into the feedback module 212. For some devices and some APIs, the arguments for such a function call is precisely three forces, one for each Cartesian axis. For such a function, the forces determined in block 308 as described by Equations (1) and (2) can be directly input as arguments for the force feedback function.

Short-Duration Lockout Damping

In one embodiment, the biodynamic feedthrough mitigation module 214 not only tracks the accelerations of the dynamic environment 150 received from the accelerometer 216, but also tracks the instantaneous rate of change of these accelerations. Mathematically this is represented by the first derivative of the acceleration curves.

In one embodiment, when the rate of change of the acceleration of the dynamic environment 150 along any axis of motion exceeds a threshold amount, the biodynamic feedthrough mitigation module 214 instructs the feedback module 212 to provide a high damping force to the effector from all axes. Thus, under large changes in acceleration, the effector 103 is effectively locked out by damping, as it is determined that biodynamic feedthrough is too large under such conditions to effectively operate the master control system 200.

While the damping forces applied when the threshold is reached are referred to as "lockout damping," they do not need to completely immobilize the effector 104 and the manipulator 103. In one embodiment, the lockout damping force is released as soon as the rate of change of acceleration falls below the threshold. In another embodiment, even if the rate of change of the acceleration remains above the threshold, the lockout damping times out and is released after a certain time period. This time period can be made short enough to be virtually transparent to the user.

In another embodiment, the effector 104 is only locked out in one direction, the direction being determined by the acceleration vector whose rate of change exceeded a threshold amount. For example, in one embodiment, only the gravitational load—that is accelerations along the vertical axis—is used for lock-out damping.

As a practical matter, in one embodiment, before the rate of change of the acceleration signals from the accelerometer 216 is measured, the acceleration signals are filtered for high-frequency accelerations that do not have significant impacts on biodynamic feedthrough. For example, a vehicle traveling even on a smooth road produces a high-frequency vibration which would result in the acceleration derivative always indicating high rates of change. However, this vibration does not cause significant biodynamic feedthrough. Thus, in one embodiment, the accelerations samples are first filtered for high-frequency vibrations, before the rate of change is determined.

Adjusting Gravitational Environments

As explained further above, the dynamic environment 150 may be experiencing dynamic or non-terrestrial gravitational forces, as would be the case if the dynamic environment 150 were an airplane, an extra-terrestrial space vehicle or station, or even a truck traversing an unpaved road. As explained above with reference to blocks 302 and 304 of FIG. 3, the biodynamic feedthrough mitigation module 214 is continuously receiving effector data (block 302) from the input module 202 and accelerometer data (block 304) from the accelerometer 216.

In block 312, the biodynamic feedthrough mitigation module 214 determines the gravitational environment of the dynamic environment 150. This can include adding or subtracting observed vertical accelerations to the one G or Earth's gravity to determine the instantaneous gravity experienced by the master control system 200.

The gravitational environment may also include a determination of the rate of change of the instantaneous gravity, which can be calculated using the first derivative of the instantaneous gravity curve. The biodynamic feedthrough mitigation module 214 will most likely use a fast approximation method—such as Newton's method—to track the instantaneous rate of change of the vertical downward force experienced by the master control system 200.

As described above, the manufacturer of the haptic device used in master control system 200 provides application developers with APIs to help them develop applications. For haptic devices with swappable effectors 104, the API will generally provide a function call to set the mass of the effector 104. In one embodiment, this function intended to update effector mass is used to input a vertical force to the effector 104 to correct a dynamic or non-terrestrial gravitational environment.

In one embodiment, in block 314, the biodynamic feedthrough mitigation module 214 determines the apparent weight of the effector 104 in the observed gravitational environment. In one embodiment this is done by calculating a gravitational load being experienced by the master control system 200 and the dynamic environment, and multiplying the mass of the effector 104 by the calculated gravitational load. This calculated instantaneous apparent weight can then be provided to the feedback module 212 using the effector mass setting function call.

Mitigating Biodynamic Feedthrough Using Active Counterforces

As explained above with reference to blocks 302 and 304 of FIG. 3, the biodynamic feedthrough mitigation module 214 is continuously receiving effector data (block 302) from the input module 202 and accelerometer data (block 304) from the accelerometer 216. In block 316, the biodynamic feedthrough mitigation module 214 determines a counterforce to be applied to the effector 104 to mitigate biodynamic feedthrough.

This counterforce is different from the damping force determined in block 308 of FIG. 3. The damping force from block 308 of FIG. 3 is designed to slow down and dampen unintended inputs, whereas the counterforce determined in block 316 of FIG. 3 is designed to directly counteract any unintended input. In other words, the counterforce is intended to counteract the effector's 104 inertial response to accelerations of the dynamic environment 150, thereby eliminating the need for the user to adjust the force applied to the effector 104, whereas the damping forces described above are used to reduce the motion of the effector 104 that results from the variable acceleration loading of the user's arms and hands.

In one embodiment, the appropriate counterforce can be determined by testing the effects of environmental accelerations on an unmanned effector 104. The counterforce along each axis then is the force to cancel such movement. This result is the perceived weight of the effector 104 remaining constant to the user under accelerations of the dynamic environment 150, and the effector 104 remaining balanced under such accelerations.

The counterforce to be applied can be stored in a lookup table associating an acceleration with a counterforce. In one embodiment, the same lookup table can be used to determine counterforces along each axis, while in other embodiments, the three axes may have different counterforce values associated with accelerations. In yet another embodiment, the counterforces may be based on measurements taken not on an unmanned effector 104, but on an effector 104 being held by a hand.

Filtering Biodynamic Feedthrough

The processes described with reference to FIGS. 2-3 are directed to mitigating biodynamic feedthrough at the manipulator 103. By applying various forces using the feedback module 212, these processes and apparatuses aim to prevent the unintended movement of the effector 104. However, these methods may not be able to eliminate all biodynamic feedthrough. Furthermore, some devices may not have haptic feedback systems that can be used to provide forces to resist biodynamic feedthrough.

In one embodiment, the present invention aims to filter out input signals generated by the manipulator 103 that are caused by biodynamic feedthrough. In such embodiments, the system assumes that biodynamic feedthrough has already caused unintended effector movement. Various embodiments of filtering out such unintended effector movement are now described with reference to FIGS. 4-5.

Figure 4:
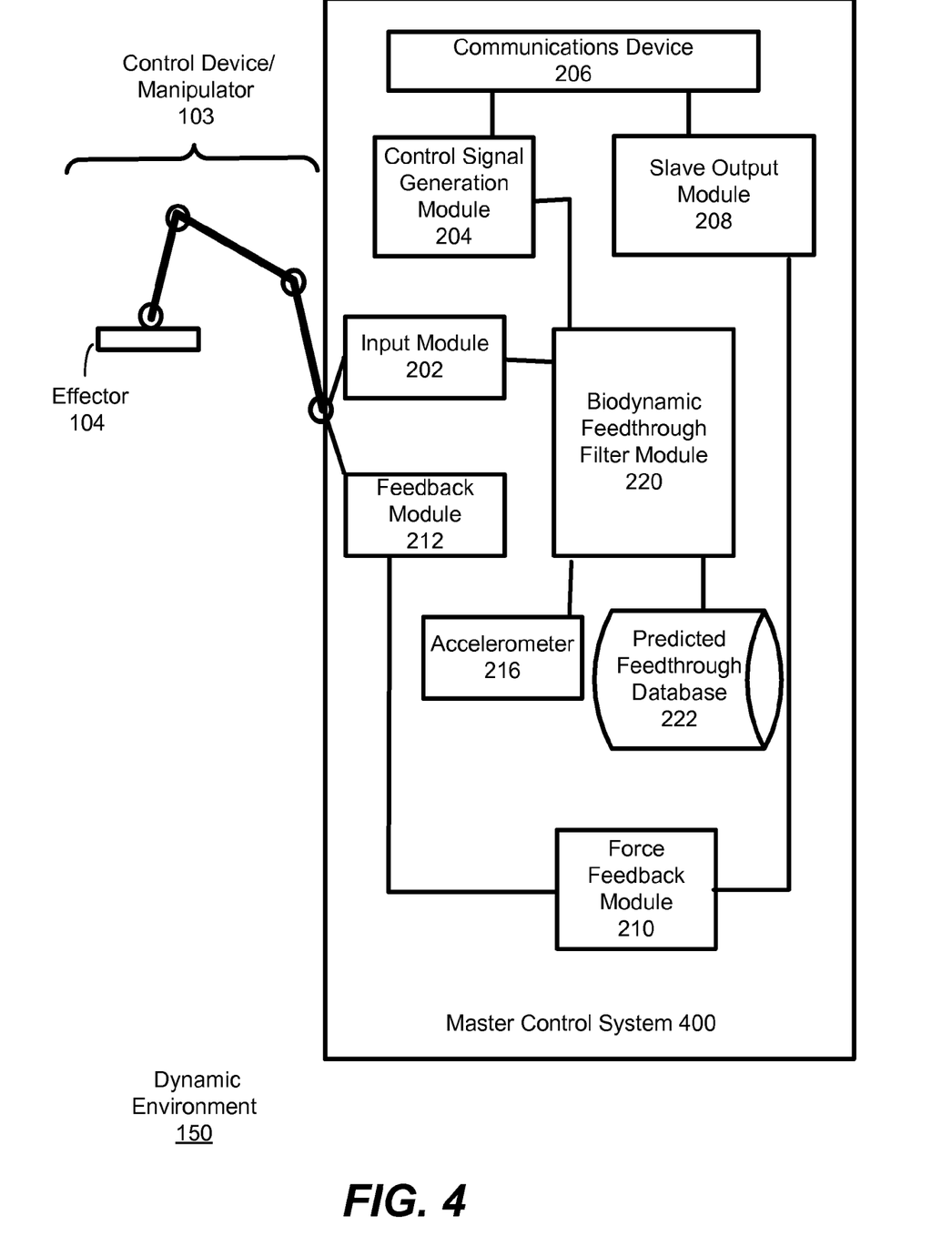
FIG. 4 illustrates a master control system in accordance with another embodiment of the present invention.

Generally, the master control system 400 is similar to master control system 200 shown in FIG. 2. Indeed, modules with identical numbers generally function in the manner described with reference to FIG. 2. In particular, data from various position sensors on the manipulator 103 is provided to the input module 202. The input module 202 in turn determines what is happening to the effector 104 in space, and generates a signal—referred to herein sometimes as "the input signal"—representing effector movement in three dimensional space.

The control signal generation module 204 receives the input signal, and uses it to determine what should be done at the slave. As described above, basically the control signal generation module 204 receives a signal representing movement in "manipulator space" and translates it into a signal representing movement in "slave device space." The control signal generation module 204 outputs a control signal to be provided to the slave device 112.

In one embodiment, instead of the input signal generated by the input module 202 being passed directly to the control signal generation module 204, it is first passed to a biodynamic feedthrough filter module 220. The biodynamic feedthrough filter module 220 receives accelerometer data from the accelerometer 216 regarding the instantaneous accelerations experienced in the dynamic environment 150. The accelerometer functions in the manner explained further above.

In one embodiment, the biodynamic feedthrough filter module 220 uses the accelerometer data to adjust the input signal in a way to filter out biodynamic feedthrough. The biodynamic feedthrough filter module 220 has access to a predicted feedthrough database 222. In one embodiment, the predicted feedthrough database 222 stores tables and records that are the parameters of a dynamic model that can be used to model predicted biodynamic feedthrough.

There are various ways to model biodynamic feedthrough. In one embodiment, the dynamic model is a simplified mass, spring, dashpot idealization. In such an embodiment, the predicted feedthrough database 222 associates positions of the effector 104 with model parameters, such as effector mass, spring resistance, and damping resistance, to simulate a dashpot. Since biodynamic feedthrough is affected by effector position, different parameters are stored for different positions of the effector 104. The orientation of the effector 104 may also affect biodynamic feedthrough, so in one embodiment, effector orientation is also an index into the predicted feedthrough database 222.

In one embodiment, the biodynamic feedthrough filter module 220 uses the model parameters looked up in the predicted feedthrough database 222 and the acceleration data from the accelerometer 216 to model the predicted biodynamic feedthrough. Then, the modeled biodynamic feedthrough is filtered out of the input signal generated by the input module 202. The filtered signal is them provided to the control generation module 204.

According to another embodiment of the present invention, the predicted feedthrough database 222 may store three tables. Each of the three tables can associate an acceleration along one of the three axes of motion with a corresponding correction along that axis of motion. An example record in such a table could be represented as [Acceleration|Predicted Biodynamic Feedthrough]. The "Acceleration" is an acceleration value along one axis from the accelerometer 216. The "Predicted Biodynamic Feedthrough" is the expected unintended motion of the effector 104 along the same axis.

In another embodiment, the predicted feedthrough database 222 can store a single larger table which can be used to account for more complex acceleration associations. For example, a record in such a table may be represented as: [(Acc.x, Acc.y, Acc.z)|(Pbf.x, Pbf.y, Pbf.z)], where "Acc.x" represents acceleration along the x-axis (and so on) and Pbf.x represents the predicted biodynamic feedthrough along the x-axis (and so on). Thus for each acceleration sample from the accelerometer 216, the biodynamic feedthrough filter module 220 can look up a corresponding predicted biodynamic feedthrough in the predicted feedthrough database 222. To make the lookup table smaller, the acceleration reading may be rounded up or down to a nearest represented interval.

In yet another embodiment, the predicted biodynamic feedthrough depends not only on the instantaneous acceleration experienced by the dynamic environment, but by the position—including orientation—of the effector 104 in its effector space—commonly expressed in relation to a point at the base of the manipulator 103. Accelerations of the dynamic environment 150 may have different effect between the user holding the effector 104 close to his core or away from his core with outstretched arms.

For example, a record in the predicted feedthrough database 222 can be represented as: [(Acc.x, Acc.y, Acc.z); (EffPos.x, EffPos.y, EffPos.z)|(Pbf.x, Pbf.y, Pbf.z)], where EffPos.x is the position of the effector 104 along the x-axis or effector space. Effector space need not be represented by Cartesian coordinates, and the coordinate system used to show the position of the effector 104 need not be the same as that used by the accelerometer 216.

In one embodiment, the values for the predicted feedthrough database 222 are determined experimentally. The master control system 200 can first be operated by a user in a non-dynamic environment, and the input signals of the user performing a repeatable task can be recorded. Next, the master control system 200 can be placed in a dynamic environment 150, where the user can repeat the same task under dynamic accelerations of the dynamic environment 150.

Once again, the input signals for this second task would also be recorded. From comparing the input signals, the dynamic feedthrough can be observed for various accelerations and effector positions. From this comparison, the records of the feedthrough database 222 can be created.

Once the biodynamic feedthrough filter module 220 looks up the predicted biodynamic feedthrough in the predicted feedthrough database 222, it can use it to adjust the input signal received from the input module 202. In essence, the predicted biodynamic feedthrough is an expected error signal that can be used to filter the input signal. The adjusted input signal is then provided to the control signal generation module 204.

Figure 5:
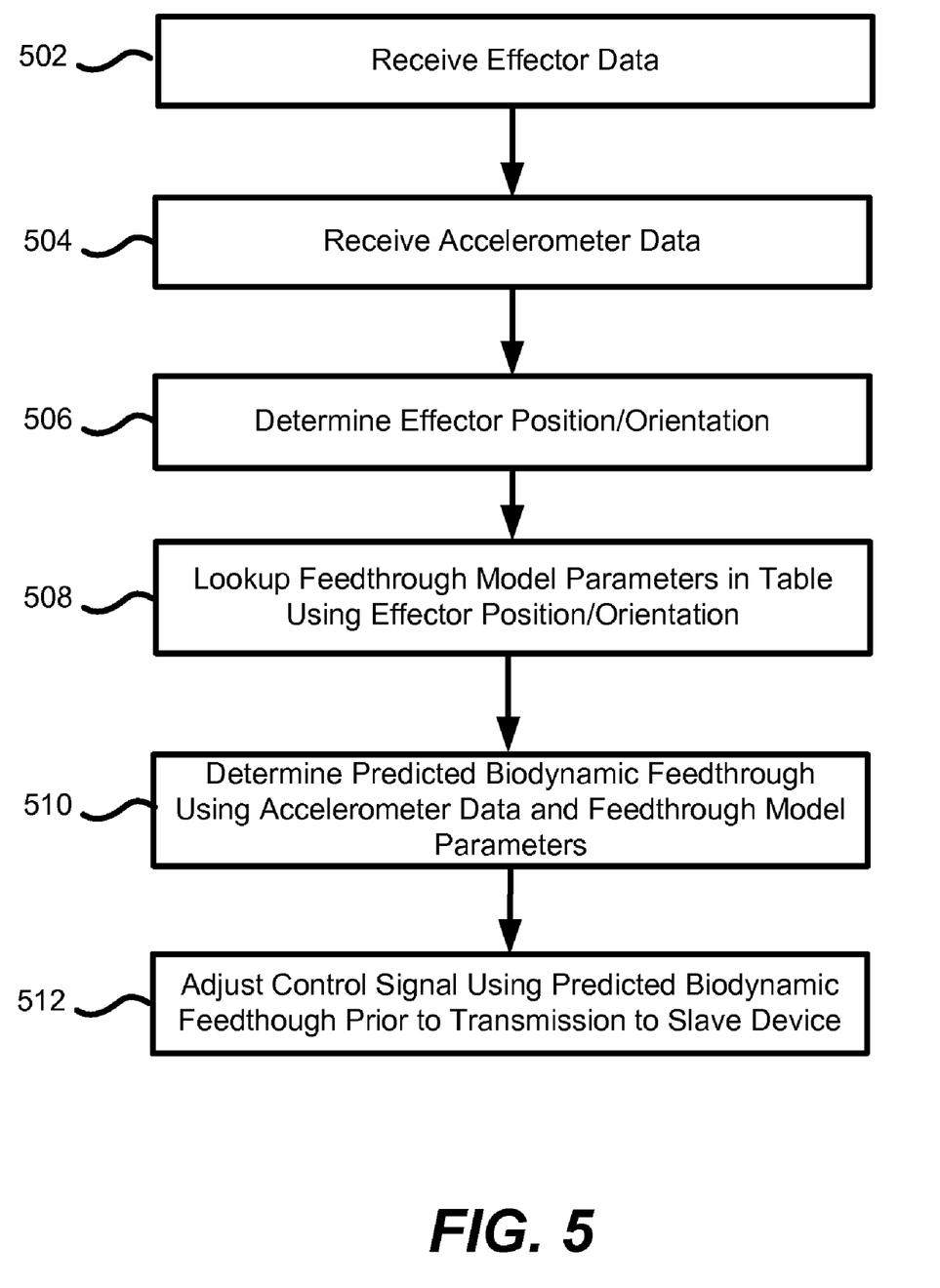
FIG. 5 illustrates a method for filtering out biodynamic feedthrough in accordance with an embodiment of the present invention.

One embodiment of a method for filtering biodynamic feedthrough is now described with reference to FIG. 5. In block 502 the effector data is received representing the instantaneous position and orientation of the effector 104. In block 504, accelerometer data is received representing the instantaneous accelerations of the dynamic environment 150. In block 506, the position and orientation of the effector is determined from the effector data. If the effector data includes effector position and/or orientation, this block may be omitted as trivial.

In block 508, the feedthrough model parameters are looked up in the database 222. In one embodiment, this is done by using the effector position data to index into the database. There need not be a record for every possible effector coordinate; rounding may be used to index the instantaneous effector position to a record of the database 222. In another embodiment, the effector orientation—as represented by one or more angles for example—is further used to index into the database 222.

In one embodiment, the record indexed by the effector position/orientation data contains the parameters of the dynamic feedthrough model. As discussed above, the model may be a dashpot idealization whose parameters depend on effector position and orientation. The parameters can thus describe the dashpot using mass, spring, and damping forces.

Once the feedthrough model has been looked up, the predicted biodynamic feedthrough is determined in block 510 by feeding the measured instantaneous acceleration data into the model. Thus, the accelerations are provided to the simulated dashpot using the parameters, and the resulting predicted movement of the effector 104 is determined to be the predicted biodynamic feedthrough. In block 512, the control signal that controls the slave device is adjusted using the predicted biodynamic feedthrough, to filter out the predicted biodynamic feedthrough. As described above, in one embodiment, this filtering can take place on the input signal, before it is processed into the control signal.

General Matters

In the foregoing description, the master control device 200 and 400 was shown as one integrated unit. It was described as a general purpose master control unit. However, a master control unit implanting various embodiment of the present invention can have many other parts and features, including but not limited to, a camera, monitors, multiple haptic devices, various sensors, a seat or other specific user area, and many other application-specific features.

Furthermore, the master control device need not be one integral unit. For example, in FIG. 2, the accelerometer 216 may be positioned differently than the haptic device having the manipulator. Furthermore, the biodynamic feedthrough mitigation module 214 may be implemented on a separate general or specific purpose computer connected to one or more haptic devices and the accelerometer 216.

Furthermore, the modules described herein represent functional software modules. The actual processing performed the master control system 200 and 400 may be carried out by one or more processors. For example, the haptic device processing force feedback signals will generally have a separate dedicated processor for that task.

While some embodiments have been described separately for easy of understanding, multiple embodiments of the present invention can be combined. Such combinations may yield superior biodynamic feedthrough mitigation. For example, the master control device may adjust damping forces, compensate for changing gravitational environment, and filter the input signal using predicted feedthrough expected for a given acceleration. For embodiments combining biodynamic feedthrough filtering with another method, such as damping mitigation, a lookup table should be provided that accounts for damping mitigation being present.

The foregoing description, for purposes of explanation, used specific nomenclature to provide a thorough understanding of the invention. However, it will be apparent to one skilled in the art that the specific details are not required in order to practice the invention. Thus, the foregoing descriptions of specific embodiments of the present invention are presented for purposes of illustration and description. They are not intended to be exhaustive or to limit the invention to the precise forms disclosed. It will be apparent to one of ordinary skill in the art that many modifications and variations are possible in view of the above teachings.

The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents.

What is claimed is:

1. A master control system adapted to allow a user of the master control system to operate a slave apparatus, the master control system comprising:
    a three-axis accelerometer to measure acceleration of an environment in three-dimensional space, the environment containing both the master control system and the user of the master control system;
    a haptic manipulator having an effector, wherein the master control system is adapted to measure a velocity of the effector;
    a biodynamic feedthrough mitigation module to determine feedthrough mitigation forces using the acceleration of the environment from the accelerometer and the velocity of the effector; and
    a feedback module to cause the haptic manipulator to apply the feedthrough mitigation forces, wherein the feedthrough mitigation forces resist biodynamic feedthrough caused by the acceleration of the environment.

2. The master control system of claim 1, wherein the biodynamic feedthrough mitigation module determines the feedthrough mitigation forces by determining a first damping coefficient for a first axis of motion, wherein the first damping coefficient is based on the acceleration of the environment along the first axis of motion.

3. The master control system of claim 2, wherein the biodynamic feedthrough mitigation module determines the feedthrough mitigation forces by determining a first damping force by multiplying the first damping coefficient by the velocity of the effector along the first axis of motion.

4. The master control system of claim 1, wherein the haptic manipulator comprises a surgical control apparatus, and the environment comprises a moving vehicle.

5. A master control system adapted to allow a user of the master control system to operate a slave apparatus, the master control system comprising:
    a three-axis accelerometer to measure acceleration of an environment in three-dimensional space, the environment containing both the master control system and the user of the master control system;
    a haptic manipulator comprising an effector, one or more sensors to measure an instantaneous position of the effector, and one or more motors adapted to apply force feedback to the effector; and
    a processor adapted to determine a velocity of the effector using the one or more sensors, to determine feedthrough damping forces using the acceleration of the environment and the velocity of the effector, and to command the one or more motors to apply the feedthrough damping forces, wherein the feedthrough damping forces resist biodynamic feedthrough caused by the acceleration of the environment.

6. The master control system of claim 5, wherein the haptic manipulator further comprises a haptic processor to process data from the one or more sensors to determine the instantaneous position of the effector.

7. A master control system adapted to allow a user of the master control system to operate a slave apparatus, the master control system comprising:
    a three-axis accelerometer to measure acceleration of an environment in three-dimensional space, the environment containing both the master control system and the user of the master control system;
    a haptic manipulator having an effector;
    an input module to generate an input signal based on movements of the effector;
    a biodynamic feedthrough mitigation module to determine whether to temporarily lock out the user from moving the effector, the determination being based at least in part on the measured acceleration of the environment; and
    a feedback module to cause the haptic manipulator to apply lockout damping forces to prevent the user from moving the effector.

8. The master control system of claim 7, wherein the biodynamic feedthrough mitigation module determines whether to temporarily lock out the user from moving the effector by filtering high-frequency accelerations from the measured acceleration of the environment.

9. The master control system of claim 8, wherein the biodynamic feedthrough mitigation module determines whether to temporarily lock out the user from moving the effector by determining an instantaneous rate of change of the filtered acceleration of the environment.

10. The master control system of claim 9, wherein the biodynamic feedthrough mitigation module determines whether to temporarily lock out the user from moving the effector by determining whether the instantaneous rate of change of the filtered acceleration of the environment is above a threshold value.

11. The master control system of claim 7, wherein the feedback module is adapted to cause the haptic manipulator to cease applying lockout damping forces after a predetermined duration of time.

12. The master control system of claim 11, wherein the predetermined duration of time is substantially transparent to the user.

13. A master control system adapted to allow a user of the master control system to operate a slave apparatus, the master control system comprising:
    an accelerometer to measure an instantaneous gravitational force experienced by the master control system and the user of the master control system;
    a haptic manipulator having an effector, wherein the haptic manipulator accepts as input a weight of the effector; and
    a processor to determine the instantaneous apparent weight of the effector using the weight of the effector and the measured instantaneous gravitational force, and to input the instantaneous apparent weight of the effector as the weight of the effector into the haptic manipulator.

14. The master control system of claim 13, wherein the effector is swappable, and the haptic manipulator is adapted to balance effectors of different weights by accepting the weight of the effector as input.

* * * * *